United States Patent [19]

Riedel

[11] Patent Number: 5,708,660
[45] Date of Patent: Jan. 13, 1998

[54] CIRCUIT ARRANGEMENT FOR ACCEPTING AND FORWARDING MESSAGE CELLS WITH AN ATM COMMUNICATION EQUIPMENT

[75] Inventor: Michael Riedel, Dresden, Germany

[73] Assignee: Siemens Aktiengesellschaft, Munich, Germany

[21] Appl. No.: 610,366

[22] Filed: Mar. 4, 1996

[30] Foreign Application Priority Data

Mar. 3, 1995 [DE] Germany ............... 195 07 569.2

[51] Int. Cl.$^6$ ............... H04L 12/54
[52] U.S. Cl. ............... 370/397; 370/416
[58] Field of Search ............... 370/381, 383, 370/395, 397, 412, 413, 414, 415, 416

[56] References Cited

U.S. PATENT DOCUMENTS

| | | | |
|---|---|---|---|
| 4,947,387 | 8/1990 | Knorpp et al. | 370/416 |
| 5,347,513 | 9/1994 | Abefelt et al. | 370/381 |
| 5,357,506 | 10/1994 | Sugawara | 370/416 |
| 5,448,559 | 9/1995 | Hayter et al. | 370/416 |
| 5,530,806 | 6/1996 | Condon et al. | 370/397 |

FOREIGN PATENT DOCUMENTS 44 34 724 C1  11/1995  Germany .

*Primary Examiner*—Benedict V. Safourek
*Attorney, Agent, or Firm*—Hill, Steadman & Simpson

[57] ABSTRACT

The ATM communication equipment (KE) serves the purpose of forwarding message cells supplied via at least one offering trunk (E1, . . . , En) during to course of virtual connections with a serving trunk arrangement (A1, . . . , An) coming into consideration for the respective virtual connection. Characteristic parameters as well as at least two different priorities are thereby defined for the respective virtual connection during the course of the call set up. The respective serving trunk arrangement has a handling device (BHE) allocated to it that has a central cell memory (CM) in which call-associated cell waiting lists are established for storing message cells. A control device (STE) in which an allocation table (LUT) is kept is connected to the cell memory. This allocation table allocates a waiting list identifier as well as a priority identifier to the call information (VPA/VCI) carried in the message cells. Based on the criterion of the individual priority identifiers, the appertaining waiting list identifiers are inserted into a reference waiting list (Q1,Q2) allocated to the respective priority. These reference waiting lists are processed with different priorities, whereby the waiting list identifiers thereby offered are successively supplied to the cell memory (CM) for an output of stored message cells.

9 Claims, 4 Drawing Sheets

CIRCUIT ARRANGEMENT FOR ACCEPTING AND FORWARDING MESSAGE CELLS WITH AN ATM COMMUNICATION EQUIPMENT

BACKGROUND OF THE INVENTION

The invention is directed to a circuit arrangement for accepting and forwarding message cells with an ATM communication equipment. Such a circuit arrangement is described in German Patent Application P 44 34 724.3 (corresponding to U.S. Ser. No. 08/531,704), which however is not prior art to the present invention. It is provided in this circuit arrangement that message streams, supplied during the course of virtual connections having different traffic characteristics, are entered into wait lists allocated to the different traffic characteristics. At their output side, these wait lists are in communication with an output control means under whose control the message cells are successively forwarded to a serving trunk connected thereto. The output control means is thereby designed such that different priorities are assigned to the individual wait lists by it and a message cell is only taken for forwarding from a wait list having a specific priority when no message cells are pending for forwarding in wait lists having higher priority.

SUMMARY OF THE INVENTION

It is an object of the present invention to provide a circuit arrangement in which message cells are priority-dependent forwarded with little circuit-oriented outlay.

In general terms the present invention is a circuit arrangement for forwarding message cells supplied to an ATM communication equipment operating according to an asynchronous transfer mode during the course of virtual connections via at least one offering trunk to a serving trunk for the respective virtual connection. The message cells respectively carry call information that indicates the respective virtual connection. Characteristic parameters for the respective virtual connection are determined during the course of the call setup, the message cell stream to be transmitted being defined by the parameters and one of at least two different priorities being determined by at least a part of these characteristic parameters. At least the respective serving trunk arrangement has a handling means supplied with the intended message streams allocated to it, with which the forwarding of message cells is controlled according to the criterion of the priorities allocated to the individual virtual connections. The respective handling means has a cell memory in which call-associated cell waiting lists are established for storing message cells respectively belonging to the virtual connections. A control means is connected to the cell memory, an allocation table, with which the call information of the message cells to be stored, has a waiting list identifier indicating the cell waiting list coming into consideration for the respective message cell as well as a priority identifier allocated to them being kept in said control means. The associated waiting list identifier is inserted, based on a priority identifier offered by the allocation table, into a reference waiting list allocated to the respective priority. The processing of the individual reference waiting lists ensues with different priorities in that a waiting list identifier pending for processing is only taken from a reference waiting list having a specific priority when the reference waiting list or, respectively, lists having higher priority is or, respectively, are empty. In response to the taking of a waiting list identifier, the central cell memory is supplied with an address information corresponding thereto for the forwarding of a message cell stored in the respective cell waiting list.

The advantage of the circuit arrangement according to the present invention is that the message cells appearing in the course of virtual connections are deposited in call-associated waiting lists of a central cell memory without taking the priority required for the respective virtual connection into consideration. Also, references to these waiting lists are inserted into reference waiting lists allocated to different priorities using only an allocation table. In this way, the reference waiting lists and, thus, the individual virtual connections can have priorities defined according to the desired traffic characteristic flexibly allocated to them by a corresponding generating of the allocation table.

Advantageous developments of the present invention are as follows.

The respective handling means is structured such that it has a first signal branch containing the cell memory available to it. A memory means containing the allocation table is provided at a branch point of the input side of the first signal branch. The memory cells of the memory means are randomly addressable by address signals corresponding to the call information of the message cells and offering, in response to a selection, a waiting list identifier respectively stored therein as well as a priority identifier. The offered waiting list identifiers are respectively supplied in parallel to further signal branches allocated to the different priorities. Only one of these allocated signal branches is enabled via switch means according to the criterion of the priority identifier allocated to the respective waiting list identifier. At least one reference waiting list for the acceptance of waiting list identifiers is respectively provided in the further signal branches. The further signal branches are merged at the output side. A signal branch allocated to a specific priority is enabled by a switch branch of high priority via further switch means to output waiting list identifiers stored in the appertaining reference waiting list.

A signal branch by a signal branch having higher priority ensues when the reference waiting list belonging to the latter is empty.

The handling means is supplied with message cells of real time connections and non-real time connections. Only two further signal branches allocated to a high and to a low priority are provided. The signal branch with high priority is allocated to the real time connections, and the maximum length of the appertaining reference waiting list is determined in conformity with the allowable, maximum message cell delay time. The signal branch having low priority is allocated to the non-real time connections, and the appertaining reference waiting list is followed by a processing means that is fashioned such that the forwarding of the supplied waiting list identifiers ensues by the latter according to the criterion of the characteristic parameters defined for the respective non-real time connection.

A respective handling means is allocated both to the offering trunks, as well as, to the serving trunk arrangements.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
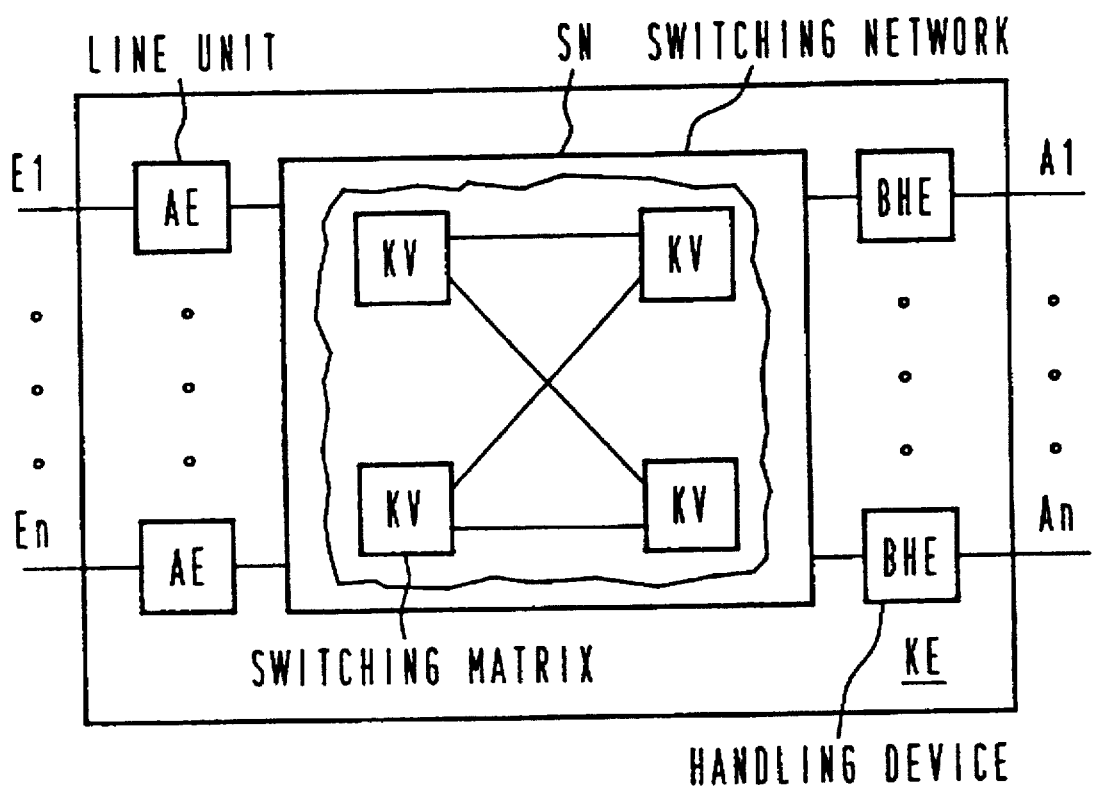
FIG. 1 schematically shows communication equipment utilizing the present invention.

FIG. 1 schematically shows an ATM communication equipment KE operating according to an asynchronous transfer mode to which are connected a plurality of offering trunks E1, ..., En, as well as, a plurality of serving trunks (arrangements). A transmission of message cells during the course of virtual connections respectively ensues according to an asynchronous transfer mode on the offering trunks and serving trunk arrangements. The message cells have a fixed length and, in addition to an information part for the transmission of the actual useful information, respectively have a cell header in which are contained, among other things, particulars with respect to the respective virtual connection or, respectively, the respective virtual path. Let the respective connection thereby be indicated by what is referred to as a virtual channel number VCI but a virtual path by what is referred to as a virtual path number VPI. The length of such a cell header is, for example 5 octets. This information part, by contrast, is formed of 48 octets in order to transmit the actual useful information. What is to be generally understood by useful information are communication signals in digital form, this including, for example, message and text signals as well as voice and video signals in digital form. Dummy cells corresponding to the message cells, moreover, are transmitted in transmission pauses.

According to FIG. 1, the offering trunks E1, ..., En are respectively supplied to a switching network SN via a line unit AE. Ensuing individually, among other things, in these line units for the individual virtual connections conducted via the respective offering trunk is a check of the adherence to the parameters determined for the respective virtual connection. A multi-stage structure having a plurality of switching matrices KV connected to one another, moreover, is indicated in FIG. 1 merely as an example of the switching network SN. Arbitrary single-stage or multi-stage switching networks, however, can also be employed. Since the structure and functioning of such switching networks is known for forwarding message cells, this shall not be discussed in greater detail below. A more detailed explanation of the structure and functioning of the line units AE shall also not be discussed in more detail, since their fashioning is not the subject matter of the present invention and arrangements for monitoring defined parameters for the individual virtual connections are well known.

According to FIG. 1, a respective handling means BHE is allocated to the serving trunk arrangements A1, ..., An in order to forward the message cells conducted via the switching network SN during the course of virtual connections to the respective output line arrangement. It is assumed below that the respective handling means is supplied with message cells that belong to virtual connections having different traffic characteristics. Let a maximum bit rate thereby be respectively guaranteed for first connections, which are referred to below as RT connections (real time connections). Examples of such RT connections are voice connections as well as video conference calls. Over and above this, let what are referred to as NRT connections (non-real-time connections) be present that can be characterized by a peak bit rate, an upper limit of the average bit rate (sustainable bit rate), a burst tolerance as well as by a cell delay tolerance (cell delay variation). As examples of such NRT connections, let connections for file transfers, bookings or for mail services be cited here. The traffic characteristic deriving for a virtual connection is thereby indicated during the setup of the respective virtual connection with corresponding particulars from the subscriber equipment requesting this connection. Characteristic parameters corresponding to these particulars are retained in call-associated fashion in the handling equipment BHE coming into consideration for the respective virtual connection. Over and above this, it is assumed that a maximum bit rate is reserved for the forwarding of message cells of RT connections via the respective serving trunk arrangement A1, ..., An, and that message cells of NRT connections are forwarded according to a statistical multiplex principle. As known, this statistical multiplex principle is based on all available resources being utilized for the transmission of message cell streams via a switching network without heeding the original traffic characteristics of the individual message cell streams. These original traffic characteristics are in turn reconstructed as needed after passing through the switching network.

Time frames that appear in periodic repetition and have a respective plurality of m time slots are thereby defined at the respective serving trunk arrangement for the forwarding of message cells. The time duration of a time slot thereby corresponds to the transmission time duration of a message cell on the respective output line arrangement, that is, one message cell is forwarded per time slot. The time duration of a time slot is also referred to below as cell cycle.

Figure 2:
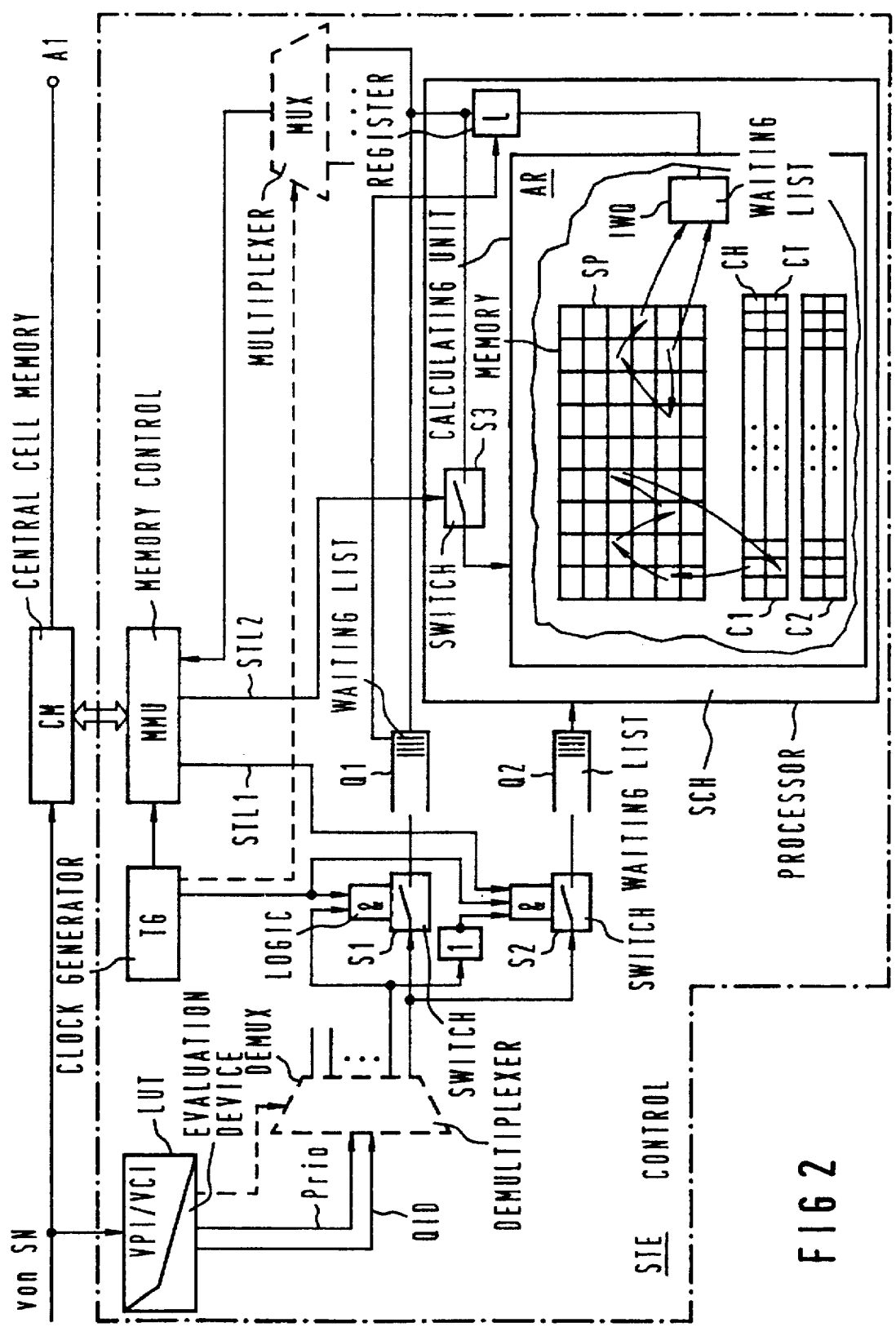
FIG. 2 shows one embodiment of the handling equipment schematically illustrated in FIG. 1.

FIG. 2 shows a possible structure of the aforementioned, identically constructed handling means with reference to the example of the handling means BHE allocated to the serving trunk arrangement A1. Only those circuit parts required for an understanding of the present invention are thereby indicated.

Accordingly, the handling means BHE contains a central cell memory CM in a first signal branch that is supplied at its input side with message cells of different virtual connections from the switching network SN indicated in FIG. 1 via a transmission line and that has its output side in communication with the serving trunk arrangement A1. Call-associated waiting lists in which the message cells of the respective virtual connection to be forwarded via the serving trunk arrangement A1 are entered are established in this cell memory. The cell memory is controlled proceeding from a control means STE that has an associated evaluation means LUT connected to the transmission line carrying the message cells and via which the evaluation means LUT is supplied with the call information VPI/VCI contained in cell headers of arriving message cells. An allocation table is maintained in this evaluation means. This allocation table unambiguously allocates a waiting list identifier QID, with which the cell waiting list coming into consideration for storing the message cell present at the moment is indicated, as well as a priority identifier to the call information VPI/VCI contained in the respective cell header. In the present exemplary embodiment, the latter, in the form of a 1-bit information, indicates whether the appertaining message cell belongs to an RT connection or to an NRT connection. This evaluation means LUT can thereby be fashioned as a memory whose memory cells can be individually randomly selected by address information derived from the call information and in which a waiting list identifier and appertaining priority number respectively allocated to one of the respective call information are stored, these being offered at the output of the memory in response to a selection.

In the present exemplary embodiment, the priority identifiers successively offered by the evaluation means are supplied to a control gate of an electronic switch S1, whereas the inverted priority identifiers are supplied to a control gate of an electronic switch S2. The switch S1 thereby represents the input of a signal branch provided for RT connections, whereas the switch S2 represents the input of a signal branch reserved for NRT connections. The breaks of these switches S1 and S2 are simultaneously supplied with the waiting list identifier belonging to the respective priority identifier, whereby one of the switches is switched conductive based on the criterion of the simultaneously offered priority identifier. In time interval in which the respective priority identifier is activated is thereby defined within an aforementioned cell cycle by a clock generator TG using the control gate belonging to the respective switch. A further control line STL1, whose function shall be discussed later in detail, is thereby also conducted to the control gate of the switch S2.

A reference waiting list Q1 is provided in the signal branch for RT connections initiated by the switch S1, for example upon employment of a first-in-first-out memory into which the waiting list identifiers conducted via the switch S1 are accepted. The maximum length of this waiting list is thereby determined in conformity with the maximally permitted delay time for message cells of RT connections. The waiting list identifiers accepted into this reference waiting list are subsequently successively supplied to a memory control means MMU belonging to the control means STE, this memory control means MMU outputting address signals corresponding to these waiting list identifiers to the cell memory CM in order to respectively forward a message cell pending in the cell waiting list coming into consideration to the serving trunk arrangement A1. The respective message cell is thereby inserted into an aforementioned time slot of a time frame.

A reference waiting list Q2 that merely serves the purpose of decoupling the working clock of a processing means SCH that follows the reference waiting list from the transfer clock for the occurring message cells is provided in the signal branch of the NRT connections initiated by the switch S2. On the basis of the supplied waiting list identifiers as well as the aforementioned characteristic parameters that are available for the respective NRT connection. This processing means determines the points in time for the output of the message cells stored in the cell memory CM for the respective NRT connection in order to reconstruct the traffic characteristic for the forwarding of the message cells that is defined for the respective NRT connection. Such a reconstruction can thereby be a time spacing defined by a peak bit rate is not downwardly transgressed in the output of successive message cells of one and the same NRT connection, this corresponding to a "spacing" function, or the time spacing of successive message cells is defined such that all of the above-recited characteristic parameters for the individual NRT connections are met. The latter is also referred to as "shaping". An example thereof shall be described in greater detail later.

When a reconstruction of the message cell streams of NRT connections is not provided but message cells of NRT connections are merely to be forwarded with a lower priority compared to message streams of RT connections, moreover, a first-in-first-out memory corresponding to the first-in-first-out memory Q1 can also be provided instead of the processing means SCH and the reference waiting list Q2 in the simplest case.

Independently of the fashioning of the signal branch provided for NRT connections, it is provided in the present exemplary embodiment that waiting list identifiers present in this signal branch are only forwarded to the memory control means MMU when the reference waiting list Q1 belonging to the signal branch for RT connections is empty, i.e. RT connections are assigned a higher priority. In the present exemplary embodiment, the outputs of the two signal branches for RT and NRT connections are merged, whereby the output of the signal branch for NRT connections is only enabled given an empty reference waiting list Q1 but is otherwise switched high-impedance. For this purpose, the signal branch for NRT connections is terminated with a register L whose output side can be switched high-impedance by a control signal output by the reference waiting list Q1. This control signal is always output whenever at least one waiting list identifier is still contained in this reference waiting list.

FIG. 2 also shows a demultiplexer DEMUX connected between the evaluation means LUT and the switches S1 and S2 as well as a multiplexer MUX connected between the common output of the signal branches for RT and NRT connections and the memory control means MMU. These can be employed when the serving trunk arrangement A1 is composed of a bundle of parallel, individual lines and individually determined virtual connections are to be conducted thereover. In this case, one signal branch for RT connections and one signal branch for NRT connections is individually allocated in the above-described manner for each of these individual lines. The signal branches belonging to the individual lines are thereby respectively connected via their switches S1 and S2 to a predetermined output of the demultiplexer DEMUX and have their common output connected to a predetermined input of the multiplexer MUX. A particular with respect to the individual line coming into consideration for the respective connection is additionally allocated to every call information VCI/VPI in the aforementioned allocation table of the evaluation means LUT, this particular being offered at the output of the evaluation means LUT together with the appertaining waiting list identifier and priority identifier and being supplied to the demultiplexer DEMUX as control signal. The common outputs of the signal branches individually allocated to the individual lines are successively connected to the memory control means MMU vie the multiplexer MUX within a cell cycle. For this purpose, the multiplexer is supplied with appropriate control signals by the aforementioned clock generator TG.

Let it also be pointed out with respect to the handling means BHE described above with reference to FIG. 2 that the handling of two different call types, namely the handling of RT and NRT connections, has only be described as an example. Given a modification of the above-described allocation table and the addition of further priority-associated signal branches, an arbitrary plurality of different call types call also be handled priority-dependent with such a handling means.

Over and above this, let it also be pointed out that handling means corresponding to the above-described handling means BHE can also be connected between the aforementioned line units AE and the switching network SN in order to first intermediately store the message cells to be transmitted via this switching network. In this case, the handling means can respectively contain a processing means SCH that, for example, is fashioned such that message cells of NRT connections are forwarded according to an aforementioned first-in-first-out principle or according to what is referred to as a round robin principle.

An example of the aforementioned calculation of the output times of message cells belonging to NRT connections by the processing means SCH shall now be described below with reference to flowcharts shown in FIGS. 3 and 4. It is thereby assumed as an example that the characteristic parameters of peak bit rate PCR, upper limit of the sustainable bit rate SCR, burst tolerance BT and cell delay variation CDV are to be reconstructed for the respective NRT connection.

As shown in FIG. 2, the processing means SCH has a memory means SP in which a memory area is provided for each NRT connection proceeding via the appertaining serving trunk arrangement A1 and, thus, for each of the cell waiting lists of the cell memory CM. Respective waiting list identifiers for possible predecessors and/or successors yet to be explained are stored in these memory areas (which can be randomly selected according to the criterion of the waiting list identifiers supplied to the processing means SCH), as are two leaky bucket parameter sets, namely a first leaky bucket parameter set LB1 allocated to the upper limit of the sustainable bit rate SCR and to the burst tolerance BT and a second leaky bucker parameter set LB2 allocated to the peak bit rate PCR and to the cell delay variation CDV. Parameter set LB1 thereby contains a momentary leaky bucket filling value $L_s$, a maximum value of the leaky bucket $S_s$ dependent on the burst tolerance BT, as well as a time value $T_{SCR}$ with which the time spacing of two successively following message cells is determined taking the upper limit of the sustainable bit rate SCR into account. In a corresponding manner, the leaky bucket parameter set LB2 contains a momentary leaky bucket filling value $L_p$, a maximum value of the leaky $S_p$ dependent on the cell delay variation CDV, as well as a time value $T_{PCR}$ with which the time spacing of two successively following message is defined taking the peak bit rate PCR into consideration. A time value LST is also maintained in common for LB1 and LB2, this indicating the last processing point in time for a message cell of the respective NRT connection. Over and above this, two system parameters CLL and LCC are globally stored in the memory means SP, whereby CLL corresponds to the aforementioned plurality m of time slots within a time frame on the serving trunk arrangement A1, whereas LCC corresponds to the time duration of such a time slot. The values $S_s$, $S_p$, $T_{SCR}$ and $T_{PCR}$, moreover, are supplied to the processing means SCH during the course of setting up the respective NCT connection, being supplied proceeding from a control means (not shown in FIG. 1) that belongs to the switching network. Since this supplying is not the subject matter of the present invention, it shall not be discussed in greater detail.

As also described below with reference to FIGS. 3 and 4, a time interval in which the appertaining message cell is to be forwarded is determined in the present exemplary embodiment based on the criterion of the just-described leaky bucket parameter sets with every forwarding of a message cell stored in the cell memory CM to the serving trunk arrangement A1, being determined by a calculating unit AR belonging to the processing means SCH for a message cell immediately following this message cell in the same NRT connection and, thus, in the same cell waiting list. The start of the interval and the end of the interval of such a time interval are respectively represented by one of the time slots of an aforementioned time frame. A first time table C1 ("calendar") is thereby allocated to the interval starts of the time intervals determined for the individual message cells to be forwarded, whereas a second calendar C2 is allocated to the interval ends. These calendars each have a plurality of memory elements available to them that corresponds in number to the plurality m of time slots of an aforementioned time frame. As indicated in FIG. 2, a respective readout list ("chain") is thereby kept for the individual memory elements of the calendars, the waiting list identifiers intended for the respective time slot and, thus, for the respective memory element being chained with one another therein with the assistance of the pointers stored therefor in the memory means SP. Such a readout list is characterized by a start pointer CH (waiting list identifier) and by and end pointer CT that are stored in the allocated memory element.

A modulo-m counter means whose momentary counter reading indicates the current time T and is incremented by the value "1" with every beginning of a cell cycle and that corresponds to the plurality m of memory elements respectively present in the calendars is present in the arithmetic unit AR. The calendars are driven based on the criterion of this momentary counter reading in order to read out the start and end pointers CH and CT allocated to the current time T. When these pointers indicate the presence of at least one waiting list identifier in the readout list and, thus, at least one message cell stored in a cell waiting list of the cell memory CM, the readout list coming into consideration is inserted into an output waiting list IWQ that works according to the first-in-first-out principle. A waiting list identifier is forwarded therefrom per time slot to the memory control means MMU shown in FIG. 2 in order to forward a message cell from the cell waiting list of the cell memory CM indicated by this to the serving trunk arrangement A1 in the aforementioned way, namely when the reference waiting list Q1 (FIG. 2) allocated to the RT connections is empty. The readout lists of the calendar C2 thereby have priority over the readout lists of the calendar C1, that is, a readout list of the calendar C1 is only inserted into the output waiting list when the output waiting list is empty. Moreover, after the insertion of a readout list into the output waiting list, this readout list is initially characterized as empty in the appertaining calendar until new entries for a following time frame ensue. Over and above this, the waiting list identifiers kept in the appertaining readout list are removed, that is, chained out, from the readout list or, respectively, readout lists of the remaining calendar that come into consideration.

It is provided in the present exemplary embodiment that at most one reference is contained in the memory means SP and, thus, in the calendars C1 and C2 per cell waiting list of the cell memory CM. According to FIG. 2, this is achieved in that a control signal with which the appertaining waiting list identifier is forwarded via the switch S2 and the reference waiting list Q2 to the processing means SCH for processing, that is, for a determination of the output time, is output by the memory control means MMU via the control line STL1 only upon acceptance of a message cell into an empty cell waiting list of the cell memory CM. This ensues, for example, immediately after the setup on an NRT connection or, respectively, whenever no message cell for the respective NRT connection has arrived for a longer time.

Given acceptance of a message cell into a cell waiting list already filled with at least one message cell, by contrast, the switch S2 is inhibited by an appropriate control signal on the control line STL1, so that the appertaining waiting list identifier is destroyed. In this case, however, a copy of the appertaining waiting list identifier is returned to the arithmetic unit AR with the output of a waiting list identifier to the memory control means MMU and, thus, with the forwarding of a message cell allocated to this waiting list identifier to the serving trunk arrangement A1, a new output time being allocated in the above-recited way therewith on the basis of the current time T of the waiting list identifier that is present at this very moment. For this purpose, a return line is conducted from the output of the register L shown in FIG. 2 to the arithmetic unit AR, which is activated via a switch S3 only upon output of a message cell to the serving trunk arrangement A1 and a cell waiting list that remains filled. This switch is controlled via a control line ST2 proceeding from the memory control means MMU.

Following the general description of the determination of the output time for message cells accepted into the cell memory CM, this determination by the arithmetic unit AR according to the measure of the aforementioned leaky bucket parameters shall now be explained in greater detail with reference to the flowchart of FIG. 3.

The leaky bucket filling values $L_s$ and $L_p$ represent the times after whose expiration the allocated cell waiting list of the cell memory CM would be emptied via the serving trunk arrangement A1 is this cell waiting list had been hypothetically serviced with exactly the upper limit of the sustainable bit rate or, respectively, the peak bit rate. In the left branch of the flowchart, which shows the operations of the leaky bucket allocated to the upper limit of the sustainable bit rate SCR and to the burst tolerance BT, the leaky bucket filling level $L_s$ is first decremented by a value (T-LST) at the current time T of the output of a message cell to the serving trunk arrangement A1, this value (T-LST) corresponding to the outflow quantity of message cells from the allocated cell waiting list in the time interval between the last processing time LST of a message cell and the current time T if message cells were to be transmitted with the upper limit of the sustainable bit rate (SCR). A check is thereby made to see whether the value of $L_s$ resulting therefrom is negative. When this is the case, then $L_s$ is set to the value="0". only a value "0" or a positive value is allowed. The value of $L_s$ resulting therefrom is then incremented by the time value $T_{SCR}$ with which, as already mentioned above, the time spacing between two successively following message cells of the same NRT connection is determined, taking the upper limit of the sustainable bit rate SCR into account. Subsequently, the current value $L_s$ is retained for a following determination, and a delay time $DNT_{BT}$ is additionally acquired by subtracting the maximum value of the leaky bucket $S_s$ from this value $L_s$. The delay time is thereby also set to the value "0" in case a negative value derives for the delay time.

In the middle branch of the flow chart, which shows the operations of the leaky bucket allocated to the peak bit rate PCR and the cell delay variation CDV, a delay time $DNT_{CDV}$ is determined in a corresponding way, merely with the difference that the leaky bucket filling value $L_p$, the maximum value $S_p$ as well as a time value $T_{PCR}$ are utilized here. The latter, as already mentioned above, determines the time spacing between two successively following message cells of the same NRT connection, taking the peak bit rate PCR into account.

Following upon the calculation of the delay times $DNT_{BT}$ and $DNT_{CDV}$ in the left and middle branch of the flowchart, the value LST is first set to the value of the current time T and is retained for a following determination. Subsequently, the greater of the two delay times $DNT_{BT}$ and $DNT_{CDV}$ is selected, and that time slot $CSN_B$ at which the message cell present at the moment is to be forwarded at the earliest is determined therefrom, taking the current time T and the aforementioned length CLL of a time frame and, thus, the calendar as well as the length of a time slot LCC into account.

Over and above this, a point in time $VST_s:=(L_s+T)$ at which the message cell present at the moment is to be forwarded to the serving trunk arrangement A1 at the latest in order to assure the maximum spacing of two successively following message cells of one and the same NRT connection less than or equal to $T_{SCR}$ is determined on the basis of the current time T and the current value for $L_s$ previously calculated in the left branch of the flowchart at point A. The smaller value of this point in time and the point in time (T+CLL−LCC) that can be maximally represented in the calendars C1 and C2 is selected, and that time slot $CSN_E$ at which the message cell present at the moment is to be forwarded at the latest is determined, taking the current time T and the aforementioned length CLL of a time frame and, thus, of the calendar as well as the length of a time slot LCC into account.

The determination of a time interval for the forwarding of a message is thus ended and entries into the readout lists of the calendars C1 and C2 merely have to be undertaken in the aforementioned way.

Figure 3:
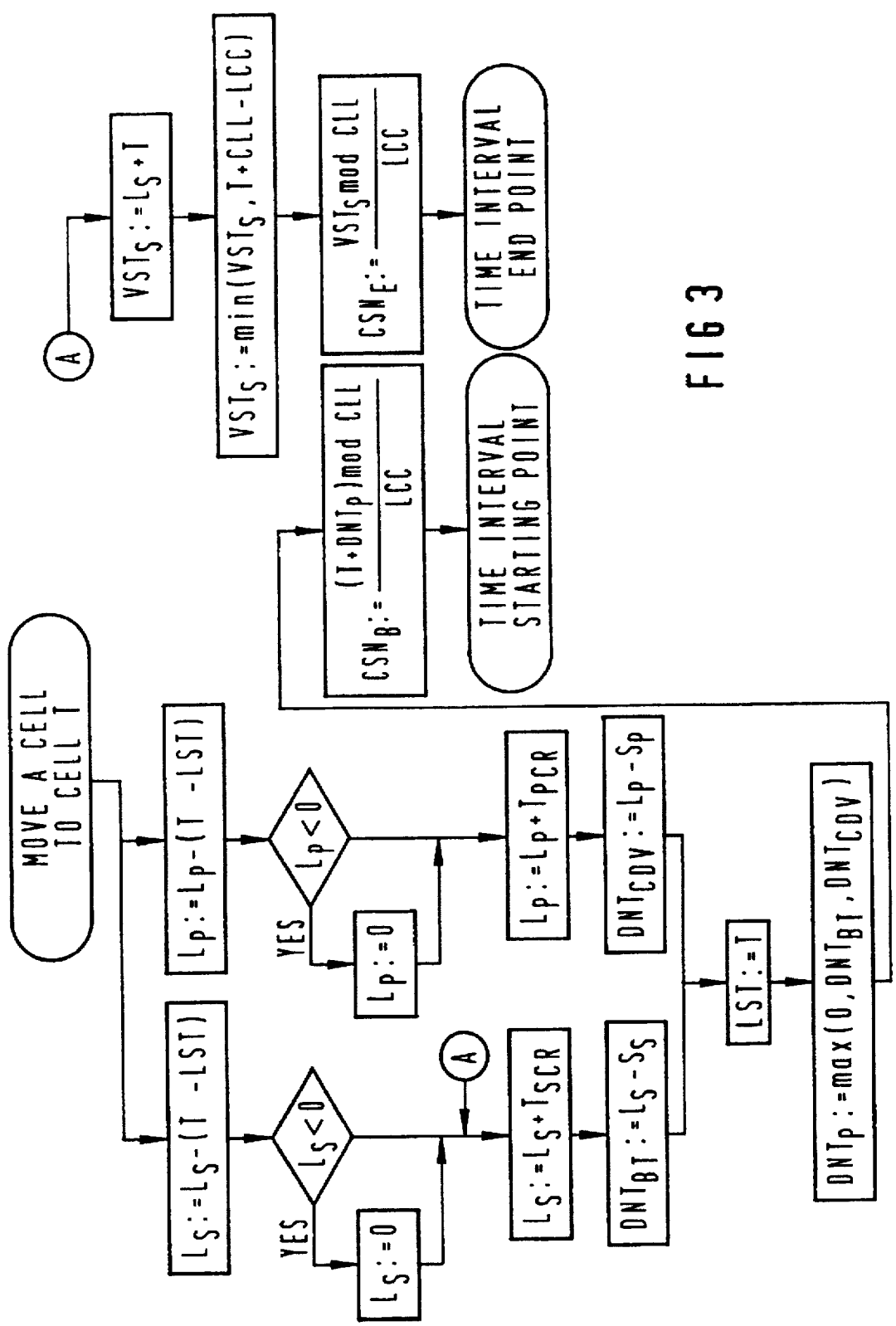
FIGS. 3 and 4 are flowcharts of the present invention.
Figure 4:
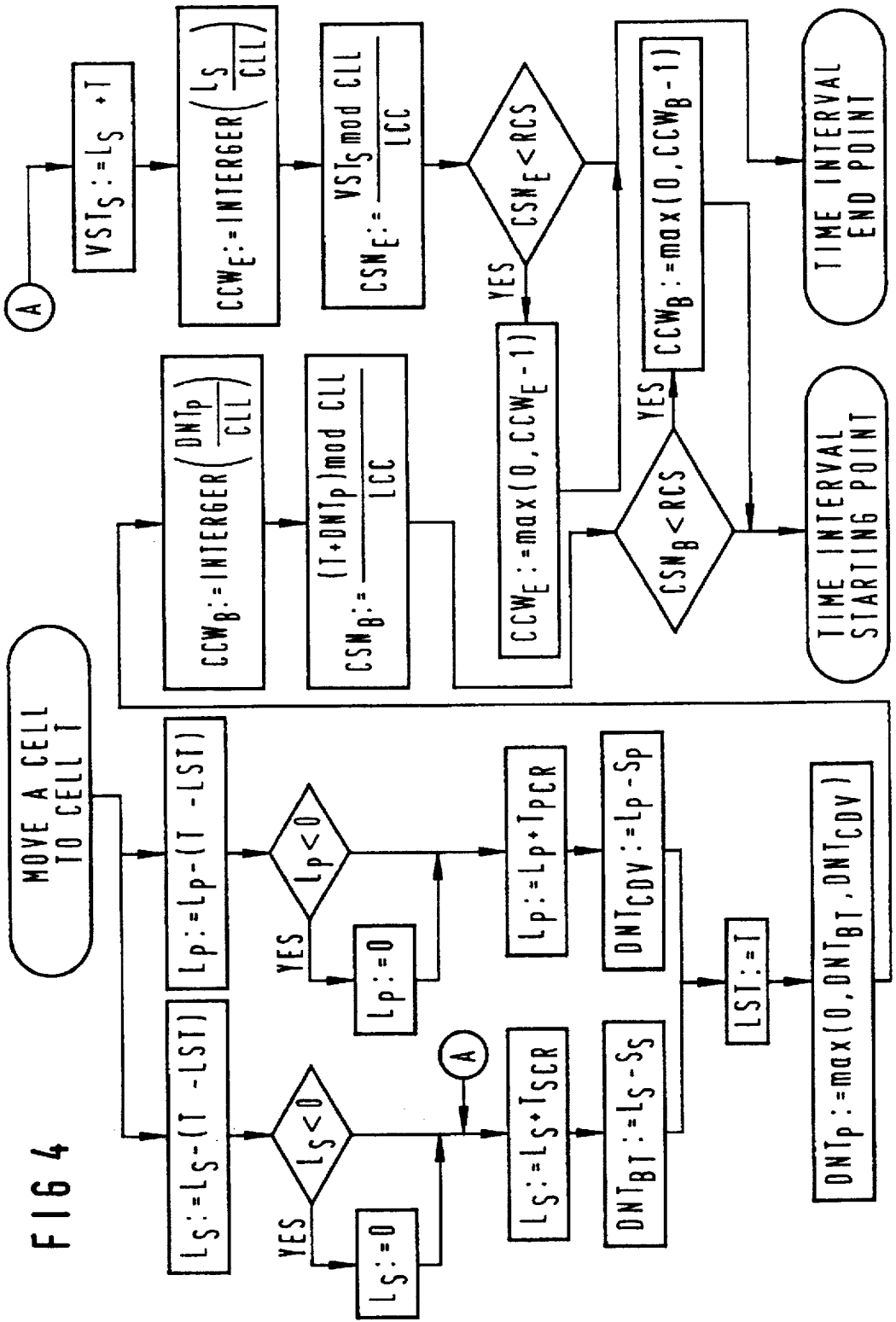

The flowchart shown in FIG. 4 essentially corresponds to the flowchart shown in FIG. 3. It is assumed therein that the aforementioned calendars and, thus, the modulo-m counter means comprise a short cycle, and the leaky bucket parameters of one of the cell waiting lists are updated during the course of a refresh in a predetermined time slot (RCS) of this cycle.

With the determination of the time slot $CSN_B$ (FIG. 3), the plurality of cycles that are required for the realization of the delay time is additionally calculated by division of the delay time $DNT_P$ by the length CLL of the calendars. The time slot $CSN_B$ is immediately taken into consideration given a value $CCW_B$="0". Otherwise, the value $CCW_B$ together with the determined time slot $CSN_B$ and the other leaky bucket parameters for the respective NRT connection are stored in the memory means SP.

In a corresponding way, with the determination of the time slot $CSN_E$ (FIG. 3), the plurality of cycles that are required for the realization of the delay time $CSN_E$ is additionally calculated by division of the value by the length CLL of the calendars C1 and C2. The time slot $CSN_E$ is immediately taken into consideration given a value $CCW_E$="0". Otherwise, the value $CCW_E$ together with the determined time slot $CSN_E$ and the other leaky bucket parameters for the respective NRT connection are stored in the memory means SP.

The stored values for $CCW_B$ and $CCCW_E$ are respectively decremented by the value "1" with each refresh. Only given a value "0" are the previously determined time slots $CSN_B$ and $CSN_E$ in the calendars C1 and C2 then taken into consideration. This procedure yields the advantage that the length of the calendars can be minimized.

In conclusion, let it also be pointed out with respect to the control executions explained with reference to the flowcharts in FIGS. 1 and 2 that these assure a forwarding of message cells of an NRT connection taking the declared peak bit rate (PCR), the upper limit of the sustainable bit rate (SCR), the burst tolerance (BT) and the cell delay variation (CDV) into consideration. If, however, only some of these parameters are to be assured for such a forwarding, only the control executions relevant thereto in the flowcharts need be utilized.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for forwarding message cells supplied to ATM communication equipment operating according to an asynchronous transfer mode (ATM) during virtual connections via at least one offering trunk to a respective serving trunk according to a respective virtual connection, said message cells respectively carrying call information that indicates the respective virtual connection, characteristic parameters for the respective virtual connection being determined during a call setup, a message cell stream to be transmitted being defined by said parameters, one of at least two different priorities being determined by at least one of said characteristic parameters, and at least the respective serving trunk arrangement having an associated handling device supplied with intended message streams, with which forwarding of message cells is controlled according to a criterion of priorities allocated to individual virtual connections, comprising:

a handling device having a cell memory in which call-associated cell waiting lists are established for storing message cells respectively belonging to the virtual connections;

a control device connected to the cell memory, said control device having an allocation table with which he call information of the message cells to be stored are in each case allocated to a waiting list identifier indicating the cell waiting list coming into consideration for a respective message cell and a priority identifiers;

switching apparatus for inserting the waiting list identifier, based on a priority identifier provided by the allocation table, into a reference waiting list allocated to the respective priority identifier;

processing apparatus for processing of individual reference waiting lists ensuing with different priorities in that a waiting list identifier pending for processing is only taken from a reference waiting list having a specific priority when at least one reference waiting list having higher priority is empty; and the control device, responding to the taking of a respective waiting list identifier, supplying the cell memory with an address information corresponding to the respective waiting list identifier for forwarding of a message cell stored in the respective cell waiting list.

2. The circuit arrangement according to claim 1, wherein said handling device has:

a first signal path containing said cell memory;

a memory device containing the allocation table at a branch point of the input side of the first signal path, the memory cells of said memory device being randomly addressable by address signals corresponding to call information of the message cells and providing, in response to a selection, a waiting list identifier respectively stored therein as well as a priority identifier;

waiting list identifiers offered by said memory device being respectively supplied in parallel to further signal paths allocated to the different priorities, only one of said allocated signal paths being enabled via a first switch device according to the criterion of the priority identifier allocated to the respective waiting list identifier;

at least one reference waiting list for the acceptance of waiting list identifiers located in each of the further signal paths;

the further signal paths being merged at the output side; and a signal path allocated to a specific priority being enabled by a signal path of high priority via a second switch device to output waiting list identifiers stored in the appertaining reference waiting list.

3. The circuit arrangement according to claim 2, wherein the second switching device is arranged such that the enabling of a first signal path by a second signal path having higher priority ensues when the reference waiting list associated with the higher priority signal path is empty.

4. The circuit arrangement according to claim 1, wherein the handling device is is arranged to accept message cells of real time connections and non-real time connections;

wherein only two further signal paths, allocated to a high priority and to a low priority, respectively, are provided;

wherein a signal path with high priority is allocated to the real time connections, and wherein a maximum length of the appertaining reference waiting list is determined in conformity with the allowable, maximum message cell delay time; and wherein a signal path having low priority is allocated to the non-real time connections, and the appertaining reference waiting list is followed by a treating device that is structured such that forwarding of the supplied waiting list identifiers ensues by the treating device according to the criterion of the characteristic parameters defined for the respective non-real time connection.

5. The circuit arrangement according to claim 1, wherein the circuit arrangement has a plurality of handling devices and wherein a respective handling device of the plurality of handling devices is allocated both to the offering trunks as well as to the serving trunk arrangements.

6. A circuit arrangement for forwarding message cells supplied to ATM communication equipment operating according to an asynchronous transfer mode (ATM) during virtual connections via at least one offering trunk to a respective serving trunk according to a respective virtual connection, said message cells respectively carrying call information that indicates the respective virtual connection, characteristic parameters for the respective virtual connection being determined during a call setup, a message cell stream to be transmitted being defined by said parameters and one of at least two different priorities being determined by at least one of said characteristic parameters, and at least the respective serving trunk arrangement having an associated handling device supplied with intended message streams, with which forwarding of message cells is controlled according to a criterion of priorities allocated to individual virtual connections, comprising:

a handling device having a cell memory in which call-associated cell waiting lists are established for storing message cells respectively belonging to the virtual connections;

a control device connected to the cell memory, said control device having an allocation table with which the call information of the message cells to be stored are in each case allocated to a waiting list identifier indicating the cell waiting list coming in consideration for a respective message cell and a priority identifier;

switching means for inserting the waiting list identifier, based on a priority identifier provided by the allocation table, into a reference waiting list allocated to the respective priority;

processing means for processing of individual reference waiting lists ensuing with different priorities in that a waiting list identifier pending for processing is only taken from a reference waiting list having a specific priority when at least one reference waiting list having higher priority is empty;

the control device, responding to the taking of a respective waiting list identifier, supplying the cell memory with an address information corresponding to the respective waiting list identifier for forwarding of a message cell stored in the respective cell waiting list, said handling device having:

a first signal path containing the cell memory;

a memory device containing the allocation table at a branch point of the input side of the first signal path, the memory cells of said memory device being randomly addressable by address signals corresponding to call information of the message cells and providing, in response to a selection, a waiting list identifier respectively stored therein as well as a priority identifier;

waiting list identifiers offered by said memory device being respectively supplied in parallel to further signal paths allocated to the different priorities, only one of said allocated signal paths being enabled via a first switch device according to the criterion of the priority identifier allocated to the respective waiting list identifier;

at least one reference waiting list for the acceptance of waiting list identifiers is located in each of the further signal paths;

the further signal paths being merged at the output side; and a signal path allocated to a specific priority being enabled by a signal path of high priority via a second switch device to output waiting list identifiers stored in the appertaining reference waiting list.

7. The circuit arrangement according to claim 6, wherein the second switching device is arranged such that the enabling of a first signal path by a second signal branch having higher priority ensues when the reference waiting list associated with the higher priority signal path is empty.

8. The circuit arrangement according to claim 6, wherein the handling device is is arranged to accept message cells of real time connections and non-real time connections;

wherein only two further signal paths allocated to a high and to a low priority are provided;

wherein a signal path with high priority is allocated to the real time connections, and wherein a maximum length of the appertaining reference waiting list is determined in conformity with the allowable, maximum message cell delay time;

wherein a signal path having low priority is allocated to the non-real time connections, and the appertaining reference waiting list is followed by a treating device that is structured such that forwarding of the supplied waiting list identifiers ensues by the treating device according to the criterion of the characteristic parameters defined for the respective non-real time connection.

9. The circuit arrangement according to claim 6, wherein the circuit arrangement has a plurality of handling devices and wherein a respective handling device of the plurality of handling devices is allocated both to the offering trunks as well as to the serving trunk arrangements.

* * * * *